J. H. GUEST.
Regulator for Electrical Water-Raising Apparatus.

No. 161,680.  Patented April 6, 1875.

Witnesses
Chas. H. Smith
Harold Serrell

Inventor
John H. Guest
per Lemuel W. Serrell
atty.

THE GRAPHIC CO. PHOTO-LITH. 39 & 41 PARK PLACE, N.Y.

UNITED STATES PATENT OFFICE.

JOHN H. GUEST, OF BROOKLYN, NEW YORK.

IMPROVEMENT IN REGULATORS FOR ELECTRICAL WATER-RAISING APPARATUS.

Specification forming part of Letters Patent No. 161,680, dated April 6, 1875; application filed November 3, 1874.

*To all whom it may concern:*

Be it known that I, JOHN H. GUEST, of Brooklyn, in the county of Kings and State of New York, have invented an Improvement in Automatic Regulators for Electrical Water-Raising Apparatus, of which the following is a specification:

An electrical engine driven by a battery has been employed in pumping water, but there has not been any means for regulating its action.

My device is made for automatically breaking the circuit to the motor when the reservoir or receptacle is filled to a certain level, and for closing said circuit when the level of the water sinks to a certain point. Thereby the motor is stopped and started without personal attention.

Figure 2:
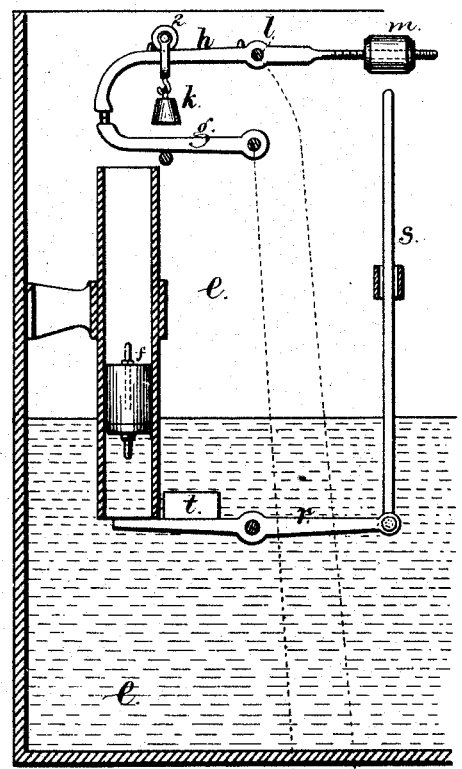
Figure 1:
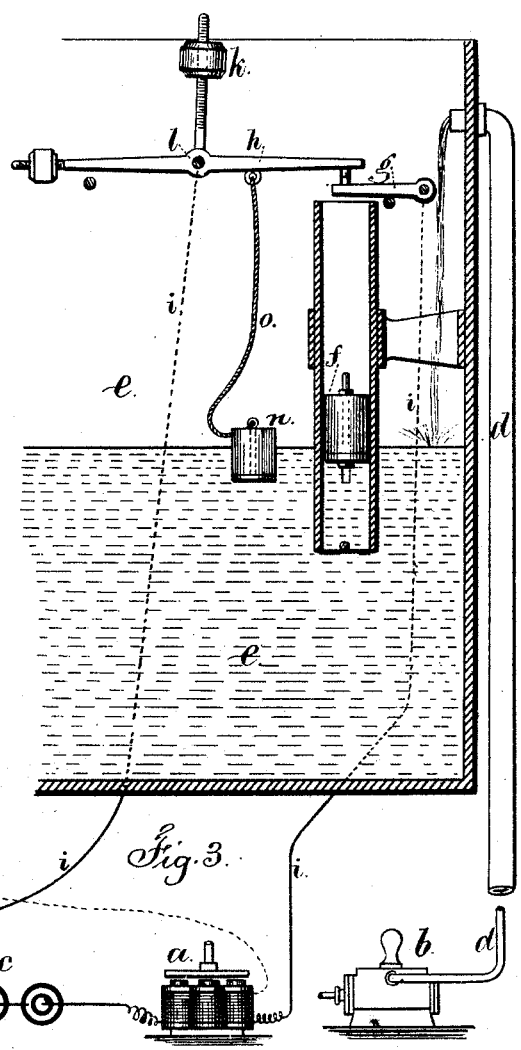
Figure 3:
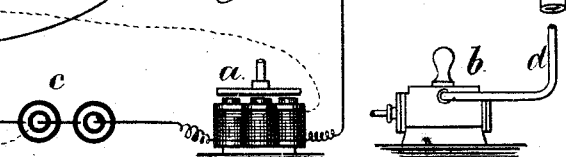

In the drawing, Figure 1 is a section, representing the circuit-breaker at the tank. Fig. 2 shows a modification of the same; and Fig. 3 illustrates the battery, motor, and pump.

The motor $a$, pump $b$, and battery $c$ are of any desired character. They form no part of my improvement. The pipe $d$ leads from the pump $b$ to the tank or reservoir $e$. The electric circuit $i$ from the battery $c$ leads through the motor $a$, and to the circuit breaking and closing apparatus at the tank. The float $f$ is guided, preferably, in a tube, and acts, at its upper end, against the lever $g$, to move it and the lever $h$. The circuit from $i$ remains closed through $g$ and $h$ until the movement causes the weight $k$ to separate $g$ and $h$. The weight $k$, in Fig. 1, is at the end of an arm above the fulcrum $l$, and when the movement of $g$ and $h$ has progressed far enough to throw the weight $k$ on the other side of the fulcrum $l$ to the lever $g$, then the lever $h$ is moved away from $g$, and the circuit broken and the engine stopped.

The same effect is produced by the levers in Fig. 2, but the weight $k$ is hung upon a sling, with a friction-wheel, 2, and hence it runs toward the fulcrum $l$ when the inclination of $h$ is sufficient, in consequence of the parts being raised by the float $f$, and the leverage of $h$ being lessened the weight $m$ is sufficient to raise the end of $h$ still farther, and separate $g$ and $h$, as aforesaid.

When the water descends to a defined level the reverse operations take place. The weighted float $n$, as shown in Fig. 1, and cord $o$ to the lever $h$, serve to move said lever $h$ until the weight $k$ is made to complete the movement and re-establish the circuit $i$. Starting the motor and pump, or else the weighted float $f$ descending and pressing upon the lever $r$, moves that, and, by the rod $s$, the lever $h$, until it is inclined sufficiently to cause the roller 2 and weight $k$ to run toward the outer end of the lever $h$, as shown in Fig. 2, and, by its superior leverage, complete the movement, raising the weight $m$ and closing the circuit through $g$, and starting the motor and pump to again replenish the reservoir. The lever $r$ is provided with a float at $t$ to more easily counterbalance the rod $s$.

It is to be understood that the weights, floats, and levers are to be so adjusted and balanced that the movements described will take place, and the floats employed will be small and the apparatus inexpensive.

The parts can be adjusted or positioned so as to open and close the circuits at the required water-levels, and, with the apparatus shown in Fig. 1, this object can be accomplished by lengthening or shortening the cord to the float $n$.

I claim as my invention—

A float and circuit-closing levers, arranged and acting substantially as described, in combination with a circuit to a battery and motor, and a pump driven by such motor, substantially as set forth.

In witness whereof I have hereunto set my signature this 30th day of October, 1874.

J. H. GUEST.

Witnesses:
 GEO. T. PINCKNEY,
 CHAS. H. SMITH.